United States Patent [19]

Tai

[11] Patent Number: 5,069,474
[45] Date of Patent: Dec. 3, 1991

[54] DOLL-CARRIAGES

[76] Inventor: Huang M. Tai, 4 Fl., No. 302, Pai Ling 5 Rd., Taipei, Taiwan

[21] Appl. No.: 590,028

[22] Filed: Sep. 21, 1990

[51] Int. Cl.[5] .................................................. B62B 7/06
[52] U.S. Cl. .................................. 280/658; 280/47.4; 297/355; 403/105
[58] Field of Search .................. 280/47.4, 47.371, 642, 280/644, 647, 650, 657, 658; 403/91, 92, 105; 297/354, 355

[56] References Cited

U.S. PATENT DOCUMENTS

| 4,632,420 | 12/1986 | Miyagi | 280/642 |
| 4,639,012 | 1/1987 | Jensen | 280/47.4 X |
| 4,836,573 | 6/1989 | Gebhard | 280/644 |
| 4,880,331 | 11/1989 | Zuh | 403/97 X |

Primary Examiner—Robert P. Olszewski
Assistant Examiner—Michael Mar
Attorney, Agent, or Firm—Kolisch, Hartwell, Dickinson, McCormack & Heuser

[57] ABSTRACT

An improved doll-carriage having a retaining and adjusting mechanism which makes assembly and operation easier. The retaining and adjusting mechanism comprises a retaining piece and an adjusting piece mounted in a fixed relation to the retaining piece. The retaining piece has a guide channel thereon for press-fittingly engaging with a corresponding rear support leg when the carriage is in an extended configuration. The adjusting piece has a protrusion with teeth and pins on an outer face thereof for engaging with corresponding teeth and holes provided in a cylindrical recess of the retaining piece. The adjusting piece is urged to bear against the retaining piece by a spring received within a receiving recess formed on the adjusting piece and secured by a cover so that the adjusting piece is angle-adjustable in a limited manner. The retaining piece has an extension wing formed on a face proximate to the outer face of the adjusting piece which prevents any undesirable gap to be formed between the retaining piece and the adjusting piece.

1 Claim, 7 Drawing Sheets

DOLL-CARRIAGES

BACKGROUND OF THE INVENTION

The present invention relates generally to light weight, less bulky doll-carriages. More particularly, the present invention relates to improved safety doll-carriages in which a retaining and adjusting mechanism is employed to simplify assembly operations, as well as to prevent dangerous movement in use.

Doll-carriages having the substantial design of an ordinary baby-carriage are known and generally comprise a respective pair of front and rear support legs; a pair of linkages; a handle operable to effectuate a changeover between a resting, or folded, and a working, or extended, position of the carriage; and a back seat linked in a fixed relation to the handle. In this type of doll-carriage, rivets, used at almost every junction point between linkages or support legs, may make assembly time-consuming and repair difficult. Also, dangerous conditions accompanying the changeover between the resting and the working position are not uncommon. As doll-carriages, like other toys, are constantly being improved in order to provide safer constructions, it may be desirable to use fastening means on doll-carriages selected for safety and reliability.

SUMMARY OF THE INVENTION

Accordingly, it is an object of this invention to provide an improved doll-carriage having a retaining and adjusting means to facilitate an easy changeover between the folded and extended position of the doll-carriage.

A further object of this invention is to provide a retaining and adjusting means to be used on doll-carriages to increase the ease and safety of operation of the doll-carriage.

Another object of this invention is to provide a doll-carriage easy to operate and assemble and simple to construct.

Yet another object of the invention is to provide an improved doll-carriage which can be adapted to introduce other suitable mechanisms, such as a reversing arm.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
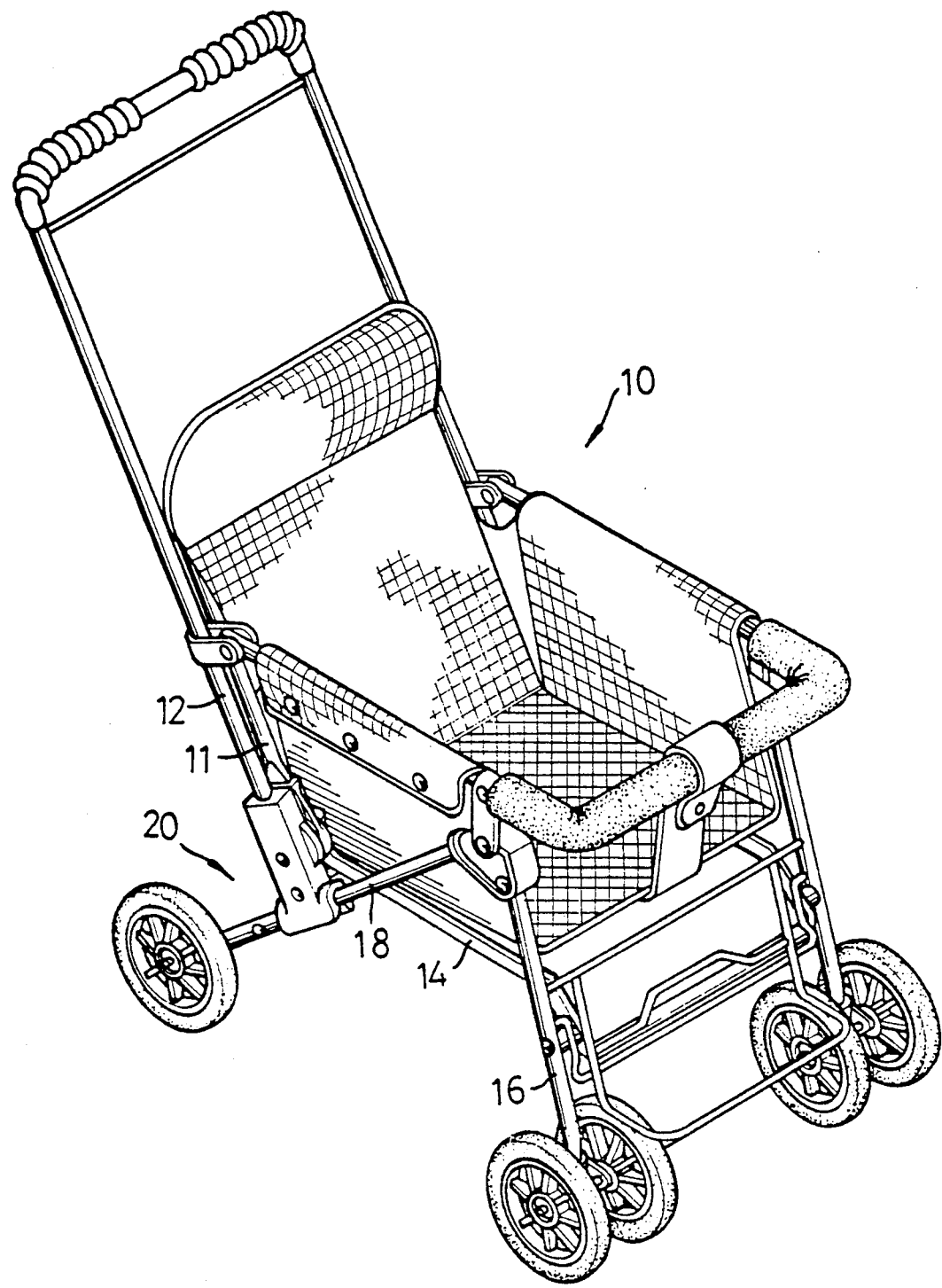
FIG. 1 is a perspective view of a doll-carriage incorporating the retaining and adjusting means of the invention.

Referring now to the drawings, and more particularly to FIGS. 1 to 4, there is shown the doll-carriage, generally designated by reference number 10, which incorporates the preferred embodiment of the present invention. The doll-carriage 10 of the invention comprises a pair of retaining and adjusting means 20 each suitably mounted at a respective one of the two opposing ends of the substantially U-shaped handle 12 and pivotally connected to one end of a corresponding linkage 14 for operably moving the front support legs 16 via the linkages 14. In response to a forward and backward movement of the handle 12, the front support legs 16 retract or extend into either a folded or extended configuration. The retaining and adjusting means 20, in accordance with the invention, will now be described more detail hereinbelow.

Figure 2:
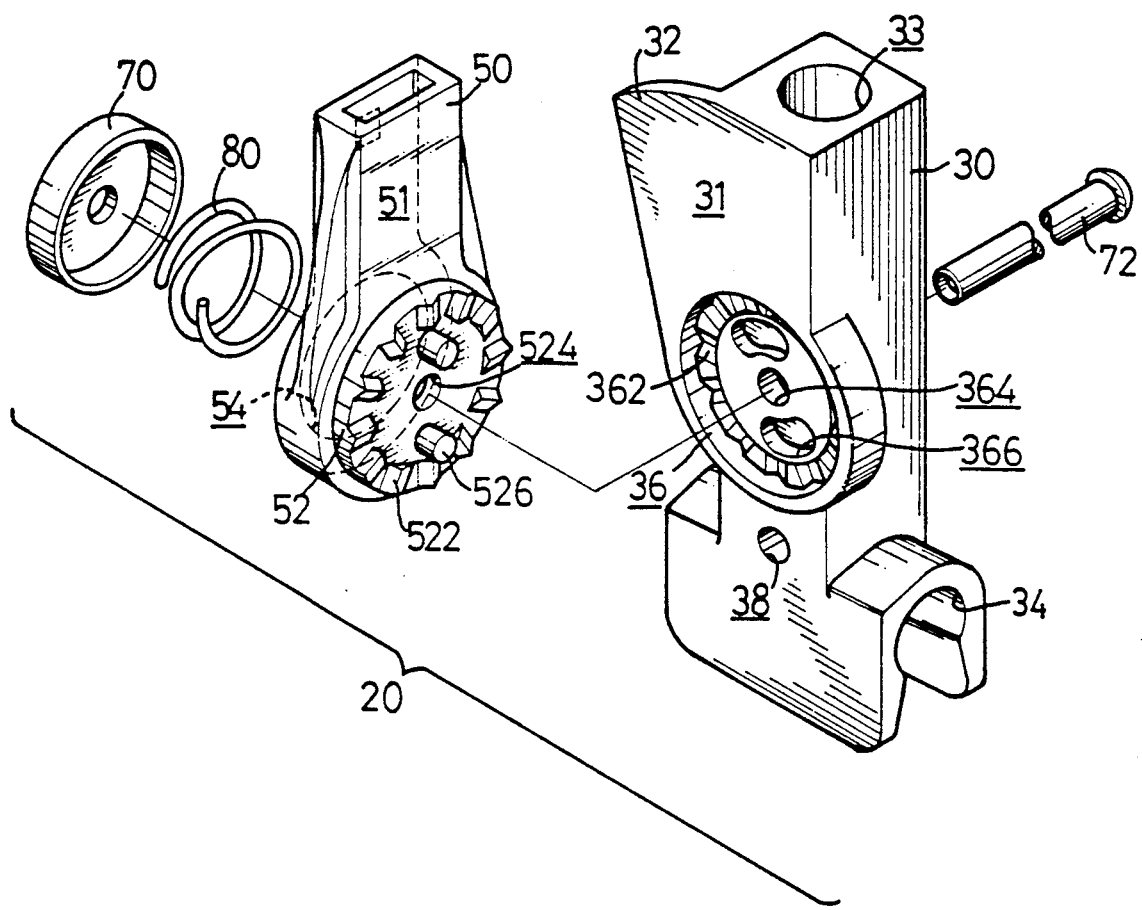
FIG. 2 is an exploded view of the retaining and adjusting means in accordance with the present invention.

Referring particularly to FIG. 2, the retaining and adjusting means 20 is composed of a retaining piece 30, an adjusting piece 50, and a cover 70 and a spring 80. The retaining piece 30 is securely attached to one end of the handle 12 by a cylindrical hole 33 thereof and comprises an extension wing 32, a guide channel 34 on a lower body thereof which extends in a direction substantially perpendicular to a corresponding side arm of the handle 12 and can be releasably engaged onto a corresponding rear support leg 18, and a cylindrical recess 36 on an inner face 31 thereof. The cylindrical recess 36 has a plurality of first divided teeth 362 on an annular periphery thereof, a first central hole 364, and two annularly elongate adjustment holes 366 diametrically formed between the teeth 362 and the hole 364.

The adjusting piece 50, which connects end portions of the back seat 11 for securing the back seat 11 to the retaining piece 50, has a substantially cylindrical protrusion 52 on an outer face 51 thereof, and a receiving recess 54 on an opposite inner face. The cylindrical protrusion 52 is accommodated to be engageable with the cylindrical recess 36 of the retaining piece 30 and has a plurality of second divided teeth 522 on an annular periphery thereof for engagement with the first divided teeth 362 of the retaining piece 30, a second central hole 524 in alignment with the first central hole 364, and a corresponding number of cylindrical adjustment pins 526 for engagement with the elongate adjustment hole 366. The elongate adjustment hole 366 has a limited length which confines the movement of the adjustment pin 526 therewithin. Likewise, the length of the adjustment hole 366, together with the length between two adjacent teeth, determine the number of available adjustments of the adjusting piece 50 and of the back seat 11 securely fixed to the adjusting piece 50. It is possible to have only one adjustment hole 366 and one corresponding adjustment pin 526 and still have the same angle-adjustable feature.

The cover 70 and the spring 80 are set within the receiving recess 54 of the adjusting piece 50 for securing the adjusting piece 50 to the retaining piece 30. The cover 70, which encompasses the spring 80, is retained in a fixed relation to the retaining piece 30. For example, a pin 72 may be provided to pass through the first and second central holes 364 and 524 and then to fix to the cover 70 by welding, riveting or the like. Since the cover 70 is in a fixed relation to the retaining piece 30, the spring urges the adjusting piece 50 to bear against the retaining piece 30. By virtue of the tooth engagement between the retaining piece 30 and the adjusting piece 50, the adjusting piece 50 is retained in a fixed relation to the retaining piece 30 until a force opposing the spring force is applied sufficient to re-adjust the orientation of the adjusting piece 50.

Figure 3:
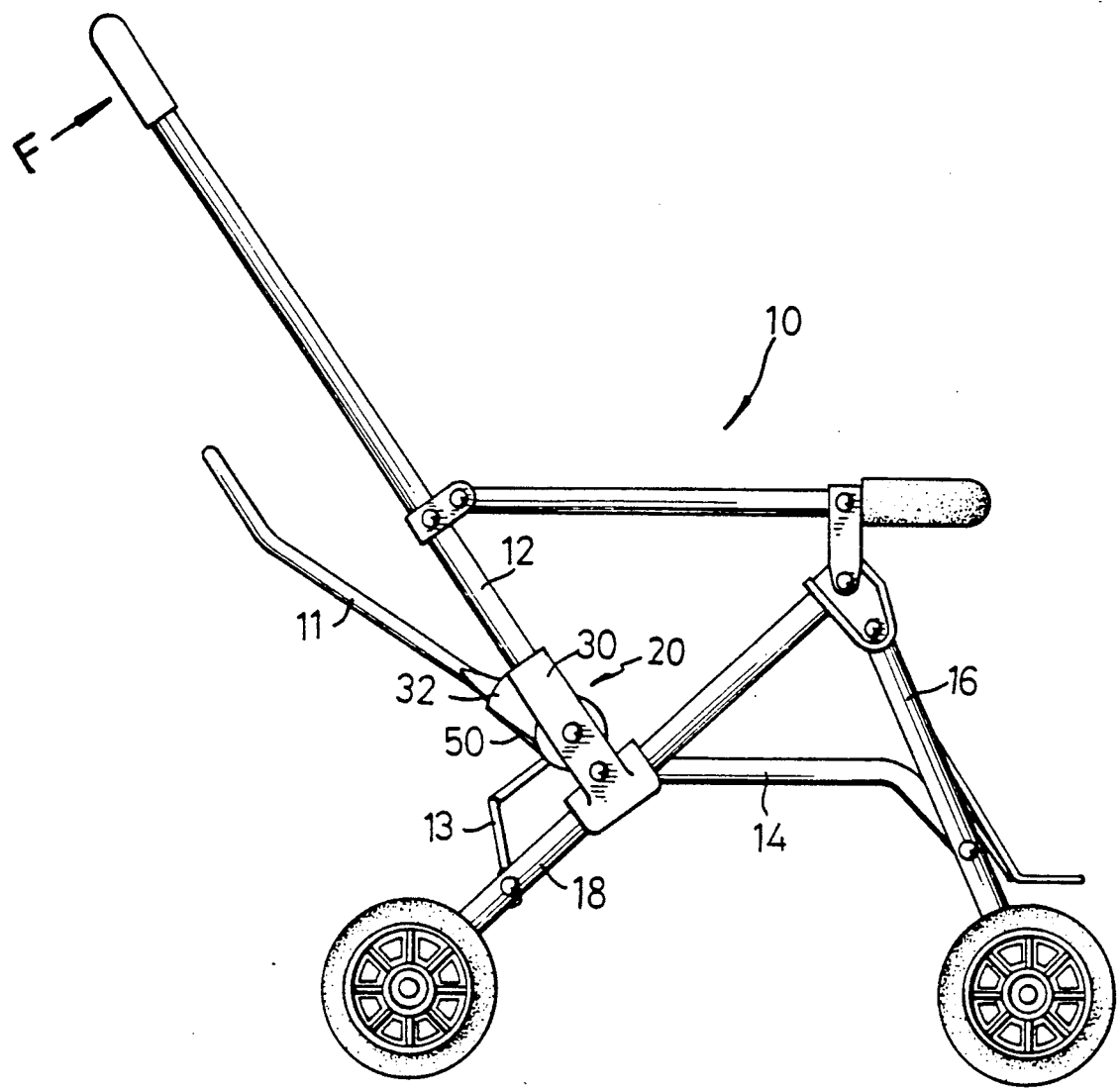
FIG. 3 is a schematic side view of the doll-carriage shown in FIG. 1, illustrating the doll-carriage in a working or extended position.
Figure 4:
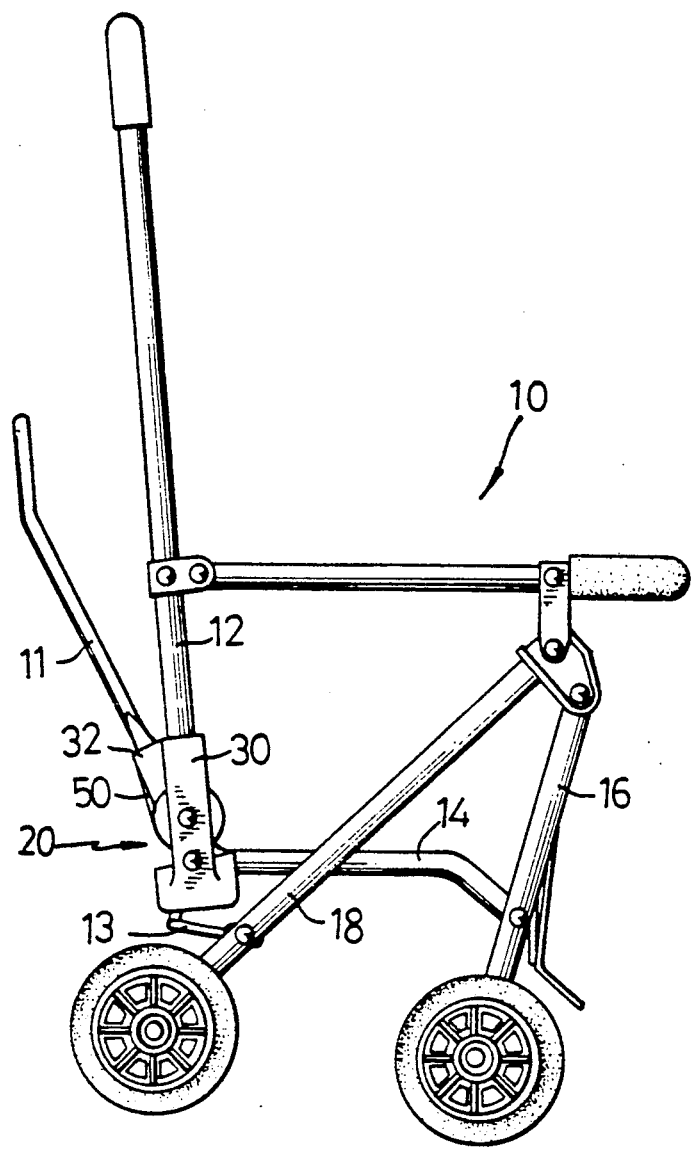
FIG. 4 is a schematic view of the doll-carriage shown in FIG. 1, illustrating the doll-carriage in a resting or folded position.

FIGS. 3 and 4 show the doll-carriage 10 of FIG. 1 respectively in an extended and in a folded configuration. In FIG. 3, the retaining and adjusting means 20 which links the handle 12, the back seat 11 and the linkage 14 rests on the rear support leg 18. The front support legs 16 shown in FIG. 3 are in their fully extended position. Alignment is assured by an auxiliary linkage 13, interconnected between the retaining and adjusting means 20 and the rear support leg 18, which also stops sliding movement of the retaining piece 30 on the rear support leg 18 and stops further extension of the front support leg 16. To effect a change from the configuration of FIG. 3 to that of FIG. 4, a forward and clockwise force acting on the handle 12, as indicated by the arrow sign F, is required to disengage the retaining piece 30 from the rear support leg 18. FIG. 4 shows the doll-carriage 10 in a fully folded configuration. A further backward movement of the retaining and adjusting means 20 is stopped by the auxiliary linkage 13. Also, from FIGS. 3 and 4, it is clear that the adjusting piece 50 is securely attached to the retaining piece 30 and that the back seat 11 is in a fixed relation to the handle 12.

Figure 5:
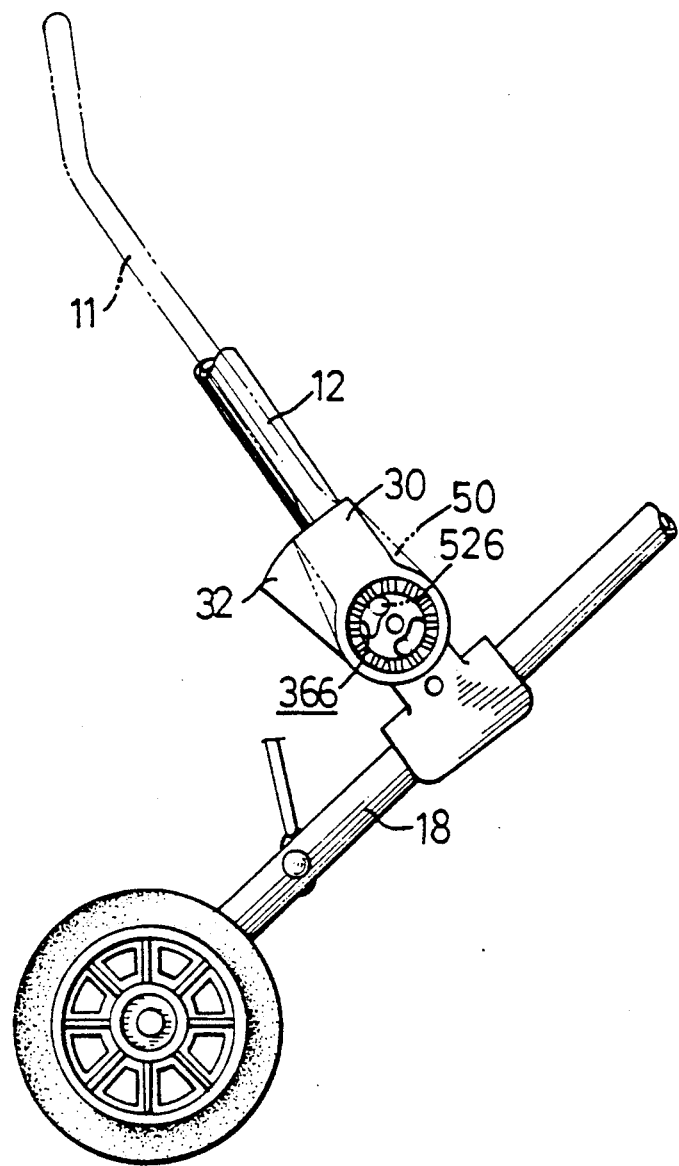
FIG. 5 is a schematic side view illustrating a first angular position of the adjusting piece relative to the retaining piece.
Figure 6:
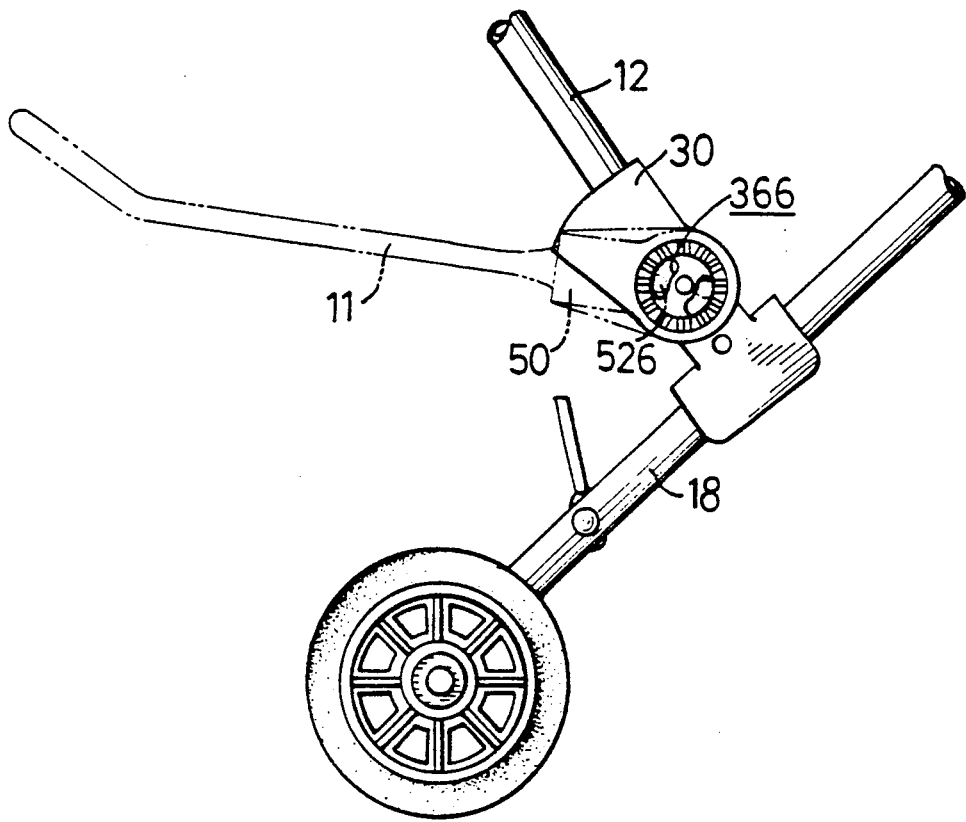
FIG. 6 is a view similar to FIG. 5 but showing a second angular position of the adjusting piece relative to the retaining piece.

FIGS. 5 and 6 show the adjusting piece 50 in forward and backward positions, respectively. As described above, the adjustment pin 526 on the adjusting piece 50 is engaged within the adjustment hole 366 so that the adjusting piece 50 is adjustable according to the length of the adjustment hole 366. It is noted that between the two extreme positions of FIGS. 5 and 6, a number of positions are available as determined by the length between two adjacent teeth. Preferably, there are three adjustable positions of the adjusting piece 50 about the retaining piece 30. A feature of the present invention can be clearly seen in FIG. 6 in which a rearmost position of the adjusting piece 50 and the back seat 11 is still covered by the extension wing 32 of the retaining piece 30 so that an undesirable gap or crotch is not present between the adjusting piece 50 and the retaining piece 30. As mentioned above, the undesirable gap might injure users, generally young girls.

Figure 7:
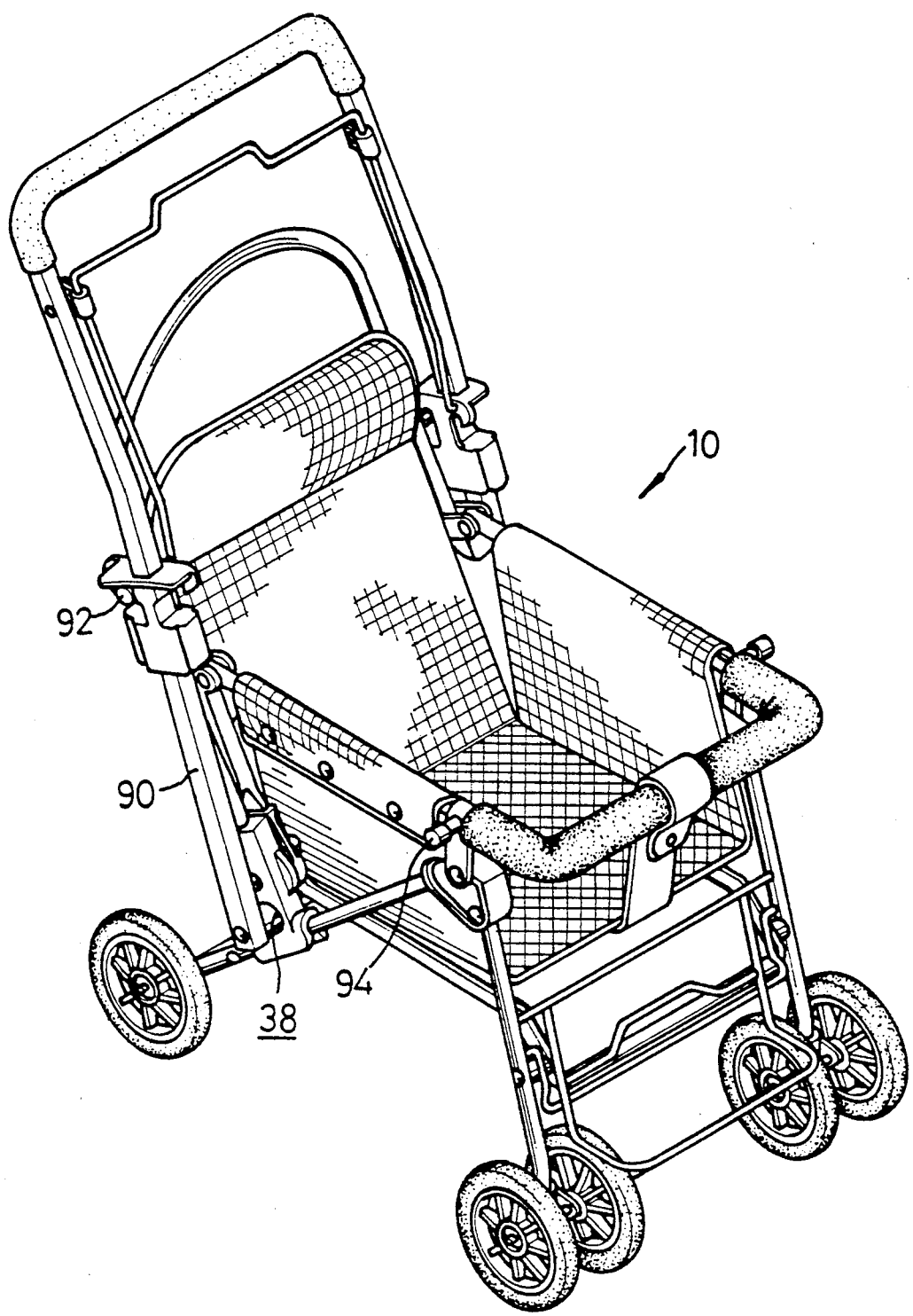
FIG. 7 shows the doll-carriage of FIG. 1 with a substantially U-shaped reversing arm mounted to the retaining and adjusting means.

FIG. 7 shows a substantially U-shaped reversing arm 90 added to the doll-carriage 10 of the invention. The reversing arm 90 is pivotally attached to a respective retaining piece 30 of the retaining and adjusting means 20. For this purpose, a mounting hole 38 is provided on the retaining piece 30 and adapted for receiving one end of a substantially U-shaped reversing arm 90. The reversing arm is pivotal on the retaining piece 30 and pins 92 and 94 are suitably provided on the doll-carriage 10 to stop or limit its pivotal movement.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

I claim:

1. In an improved doll-carriage of the type having a respective pair of front and rear support legs, a pair of linkages, a substantially U-shaped handle, a back seat linked to the handle, a pair of retaining pieces having inner and outer faces and an annular periphery, each securely attached at an end of the handle and pivotally connected to one end of a corresponding linkage for operably moving the front support legs via the linkages, a pair of adjusting pieces, each having an inner and an outer face and an annular periphery, fixed on end portions of the back seat for securing the back seat to said retaining pieces, a cover and a spring for urging each adjusting piece to bear against a corresponding retaining piece, the improvement comprising:

on each retaining piece;
    an extension wing extending rearwardly from said retaining piece and substantially occupying a crotch between the retaining piece and the adjusting piece, the crotch being formed during relative movement therebetween said extension wing having a rearwardly and downwardly extending upper edge which intersects with a downwardly and forwardly extending lower edge;
    a cylindrical recess on the inner face of the retaining piece, having a plurality of first divided teeth on an annular periphery; and
    at least one arcuate-shaped adjustment hole formed therein; and
on each adjusting piece:
    a substantially cylindrical protrusion on the outer face thereof, said cylindrical protrusion conforming to said cylindrical recess of said retaining piece and having a plurality of second divided teeth on an annular periphery thereof, said second divided teeth facing and forming a frictional engagement with said first divided teeth on said retaining piece; and
    a corresponding number of cylindrical adjustment pins in engagement with said adjustment hole for limiting an angular movement of said adjusting piece relative to said retaining piece.

* * * * *